(12) United States Patent
Brink et al.

(10) Patent No.: US 8,684,799 B2
(45) Date of Patent: Apr. 1, 2014

(54) CLEANING APPARATUS AND METHOD

(75) Inventors: Christopher Brink, Hamilton, OH (US);
Michael F. Coughlin, Cincinnati, OH (US); Sue Ann Balow, Maineville, OH (US); Michael W. Hanschke, Tega Cay, SC (US); Donald P. Veerkamp, Cincinnati, OH (US)

(73) Assignee: Diversey, Inc., Sturtevant, WI (US)

( * ) Notice: Subject to any disclaimer, the term of this patent is extended or adjusted under 35 U.S.C. 154(b) by 529 days.

(21) Appl. No.: 12/517,345

(22) PCT Filed: Dec. 7, 2007

(86) PCT No.: PCT/US2007/086772
§ 371 (c)(1),
(2), (4) Date: Feb. 18, 2011

(87) PCT Pub. No.: WO2008/073819
PCT Pub. Date: Jun. 19, 2008

(65) Prior Publication Data
US 2011/0136421 A1    Jun. 9, 2011

Related U.S. Application Data

(60) Provisional application No. 60/869,168, filed on Dec. 8, 2006, provisional application No. 60/869,262, filed on Dec. 8, 2006, provisional application No. 60/869,251, filed on Dec. 8, 2006, provisional application No. 60/885,490, filed on Jan. 18, 2007.

(51) Int. Cl.
*A22C 25/02*    (2006.01)
(52) U.S. Cl.
USPC ......................................................... 452/173

(58) Field of Classification Search
USPC ............................. 452/173, 81, 114, 120, 123
See application file for complete search history.

(56) References Cited

U.S. PATENT DOCUMENTS

| | | | |
|---|---|---|---|
| 4,021,585 A | 5/1977 | Svoboda | |
| 4,362,753 A | 12/1982 | Barta | |
| 5,711,981 A | 1/1998 | Wilson et al. | |
| 5,882,253 A | 3/1999 | Mostoller | |
| 5,928,074 A * | 7/1999 | Schrader et al. | 452/173 |
| 6,019,033 A * | 2/2000 | Wilson et al. | 99/470 |
| 6,146,263 A | 11/2000 | Mostoller et al. | |
| 6,641,475 B1 * | 11/2003 | Nielsen et al. | 452/122 |
| 6,733,379 B2 * | 5/2004 | Tsang | 452/173 |

(Continued)

FOREIGN PATENT DOCUMENTS

WO        82/02322        7/1982

OTHER PUBLICATIONS

The International Search Report prepared by the Korean Intellectual Property Office.

*Primary Examiner* — Richard Price, Jr.
(74) *Attorney, Agent, or Firm* — Michael Best & Friedrich LLP

(57) ABSTRACT

An apparatus and method for cleaning carcasses is described and illustrated, as is a device for mixing a cleaning substance that can be used in such applications. In some embodiments, the apparatus and method utilize a multi-phase cleaning substance spraying procedure in which the cleaning substance has desired levels of chlorine dioxide and is delivered to the carcasses at desired flow rates, both of which can vary between phases of the procedure and/or at different locations of the carcasses being cleaned.

34 Claims, 7 Drawing Sheets

(56) References Cited

U.S. PATENT DOCUMENTS

| | | |
|---|---|---|
| 6,742,720 B2 | 6/2004 | Nolen |
| 7,087,208 B2 | 8/2006 | Sampson et al. |
| 2002/0086903 A1 | 7/2002 | Giambrone |
| 2005/0079256 A1 | 4/2005 | Miller |

\* cited by examiner

CLEANING APPARATUS AND METHOD

CROSS-REFERENCE TO RELATED APPLICATIONS

Priority is hereby claimed to U.S. Provisional Patent Application No. 60/869,251, filed on Dec. 8, 2006, U.S. Provisional Patent Application No. 60/885,490, filed on Jan. 18, 2007, U.S. Provisional Patent Application No. 60/869,262, filed on Dec. 8, 2006 and U.S. Provisional Patent Application No. 60/869,168, filed on Dec. 8, 2006, the entire contents of which are all incorporated herein by reference.

BACKGROUND

Modern processing operations for preparing chicken, beef, pork, veal, turkey, duck, or other meats typically include an automated system that generally comprises slaughtering, bleeding, scalding, evisceration, cleaning, chilling, and packaging steps. Each step normally requires careful control to prevent cross-contamination, prevent spoilage, and possibly illness from subsequent consumption. Due to its very nature, the process of evisceration exposes the exterior body surfaces and inner body cavities of the animals or birds to the contents of digestive and intestinal tracts. As a result, the evisceration process can cause excrement, blood clots, or other pathogen-laden particulate matter to deposit and become attached to the carcass. Consequently, immediately after the evisceration step, levels of bacteria and other pathogens on the surface of the carcass typically increase relative to pre-evisceration levels.

Several methods have been developed to reduce the overall contamination rate post evisceration. Among these are co-current and counter-current chill tank systems and the addition of various processing aids to these tanks. Sonification may also be employed in chill tanks at sonic or ultrasonic frequencies.

Other methods include mechanically spraying the carcass with water and/or a treatment solution, possibly including the use of such fluids under high pressure. Additional methods include contacting the eviscerated carcass with a treatment solution in a rotating drum or immersion in a drag-through dip tank.

The use of chlorine in various forms, and the use of chlorine dioxide gas in particular as a sterilizing or sanitizing agent have long been known. One reason that chlorine-based solutions are not widely used in sterilization and sanitation systems is the problem of outgassing of hazardous chemicals from chlorine dioxide solutions. For example, current OSHA regulations permit a maximum exposure level to chlorine dioxide of under 0.1 ppm. This is a significantly lower concentration than is required for its efficacy as an anti-microbial agent. Maximum exposure levels also exist for other types of sterilizing or sanitizing agents that could otherwise be used in the food processing industry.

SUMMARY

Some embodiments of the present invention provide an apparatus for cleaning carcasses with a cleaning substance, comprising: a housing having an interior region and at least one opening for passage of carcasses into the interior region; at least one supply conduit for supplying a cleaning substance into the housing, the supply conduit coupled to at least one nozzle for dispensing the cleaning substance within the interior region; and at least one effluent conduit for conveying waste from the housing; wherein the cleaning substance is dispensed from the at least one nozzle in sequential phases, including a first phase in which the cleaning substance comprises chlorine dioxide at a concentration of no less than about 0.1 ppm, a second phase in which the cleaning substance comprises chlorine dioxide at a concentration of no less than about 10 ppm, and a third phase in which the cleaning substance comprises chlorine dioxide at a concentration of no less than about 1 ppm.

In some embodiments, a cleaning substance mixing device is provided, and comprises a fitting at least partially defining a mixing chamber; first and second inlet conduits coupled to the fitting at locations upstream from the mixing chamber; and an outlet conduit coupled to the fitting at a location downstream from the mixing chamber; wherein the first inlet conduit is coupled to the fitting at an acute angle with respect to the second inlet conduit.

Some embodiments of the present invention provide a method of cleaning a carcass with a cleaning substance, wherein the method comprises: spraying the carcass for a first period of time with a cleaning substance comprising chlorine dioxide at a concentration of no less than about 0.1 ppm; spraying the carcass for a second period of time with a cleaning substance comprising chlorine dioxide at a concentration of no less than about 10 ppm and at a flow rate greater than that of the first period of time; and spraying the carcass for a third period of time with a cleaning substance comprising chlorine dioxide at a concentration of no less than about 1 ppm and at a flow rate less than that of the first period of time.

Further aspects of the present invention, together with the organization and operation thereof, will become apparent from the following detailed description of the invention when taken in conjunction with the accompanying drawings, wherein like elements have like numerals throughout the drawings.

DETAILED DESCRIPTION

Figure 1:
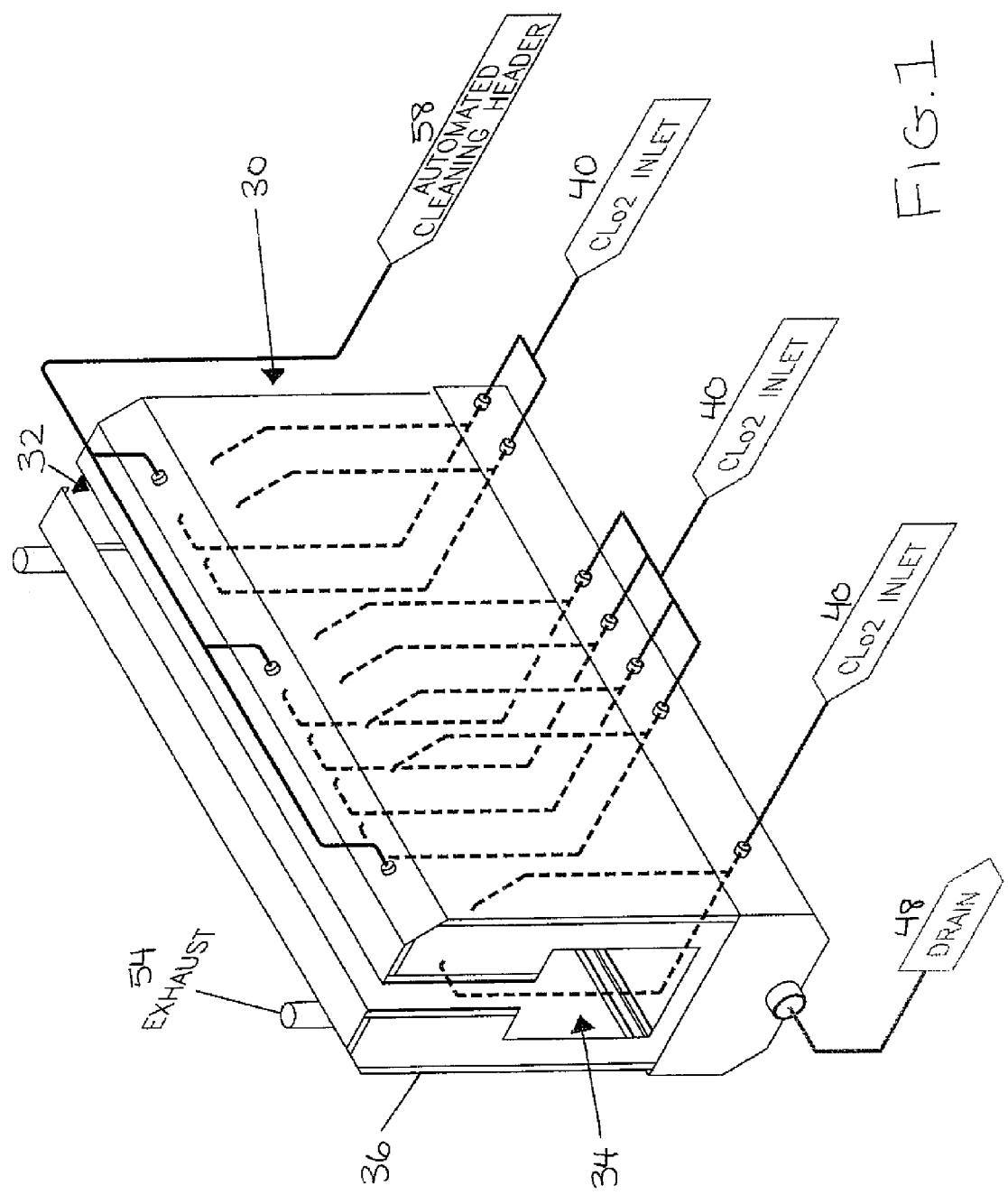
FIG. 1 is a perspective view of a carcass cleaning apparatus according to an embodiment of the present invention.

Before any embodiments of the present invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, it is to be understood that phraseology and terminology used herein with reference to device or element orientation (such as, for example, terms like "central," "upper," "lower," "front," "rear," and the like) are only used to simplify description of the present invention, and do not alone indicate or imply that the device or element referred to must have a particular orientation. In addition, unless otherwise specified, terms such as "first," "second," and "third" are used herein for purposes of description and are not intended to indicate or imply relative importance or significance.

Disclosed herein is a process and apparatus for treating food products with a cleaning substance. Although use of the process and apparatus in a number of different applications is contemplated, the use described and illustrated herein by way of example is in an OLR (on-line reprocessing) environment. In some embodiments, this process and apparatus can employ a design that ensures flood filling and/or drench spraying of animal carcasses with non-recycled acidified chlorine dioxide ($ClO_2$). Acidified $ClO_2$ is a dilute solution of $ClO_2$ (target 25-50 ppm solution, in some embodiments) that is acidified post generation (target pH 2.3-2.9, in some embodiments). Both chlorine dioxide and acidified sodium chlorite (which generates 25-50 ppm $ClO_2$ at a recommended use pH of 2.2-2.9) have been approved by some regulatory agencies for use in OLR. Acidification of $ClO_2$ is a way of using the antimicrobial qualities of both agents for OLR while providing additional benefits of improved safety, monitoring, and environmental stewardship.

In some indirect methods of acid chlorite $ClO_2$ generation (an example of which is disclosed in U.S. Pat. No. 7,087,208, the entire contents of which are incorporated herein by reference), ion exchange provides the acid required to generate the $ClO_2$ intermediate, chlorous acid; then a platinum catalyst is used to convert the chlorous acid to $ClO_2$. In such methods, operational safety is improved, since there is no direct mixing of acid and chlorite, which in a mixing failure can result in an explosive concentration of $ClO_2$. As will be discussed in greater detail below, spray cabinets according to some embodiments of the present invention can be vented, and effluent from the spray cabinet can be contained within a waste stream in order to provide a safe working environment for employees of food processing plants, as per OSHA air quality requirements. Furthermore, by reducing the amount of disinfection by-product sodium chlorite, environmental impact is lessened and food safety is improved.

Figure 2:
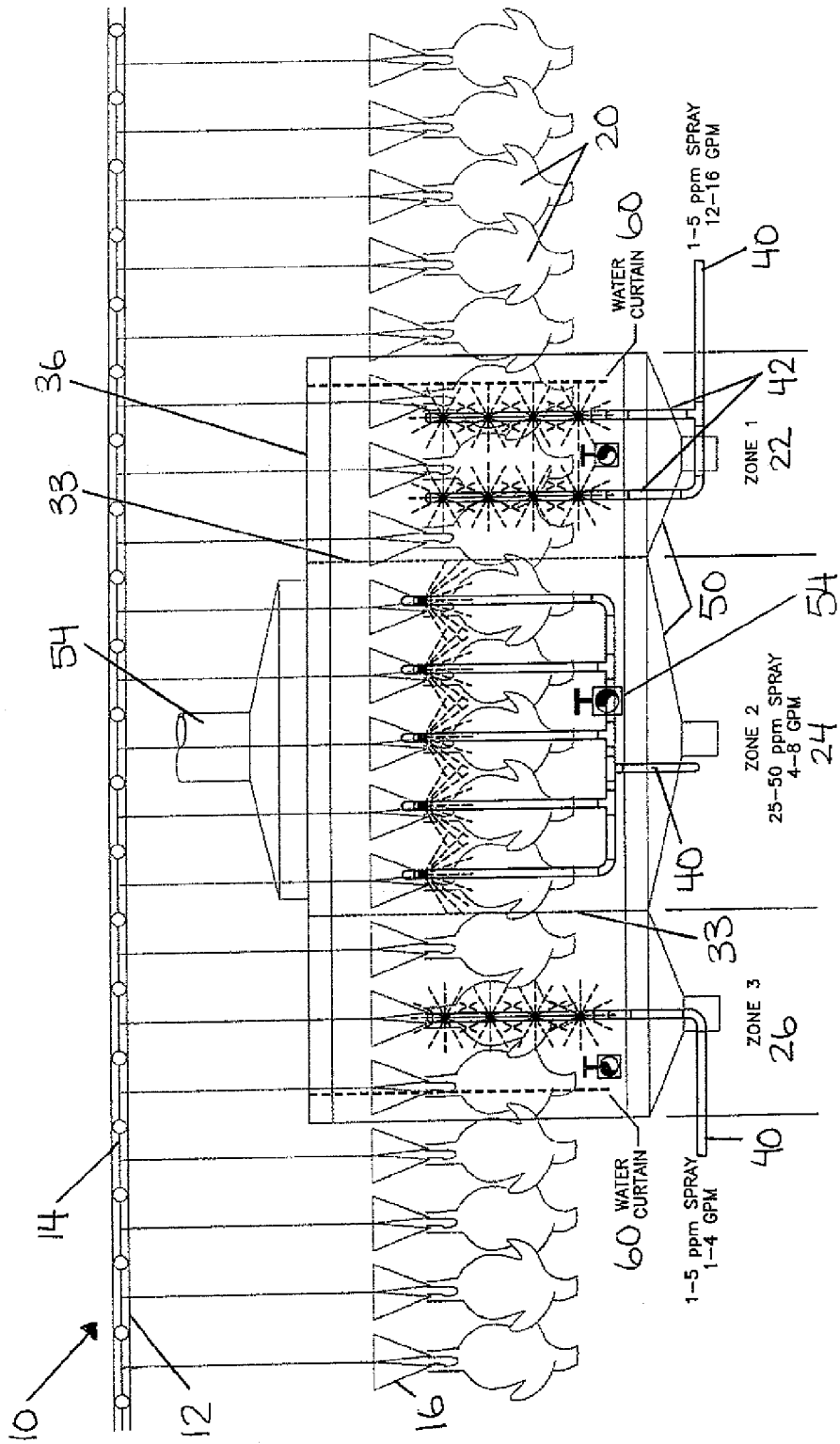
FIG. 2 is a schematic side elevational view of a carcass cleaning apparatus according to an embodiment of the present invention.
Figure 3:
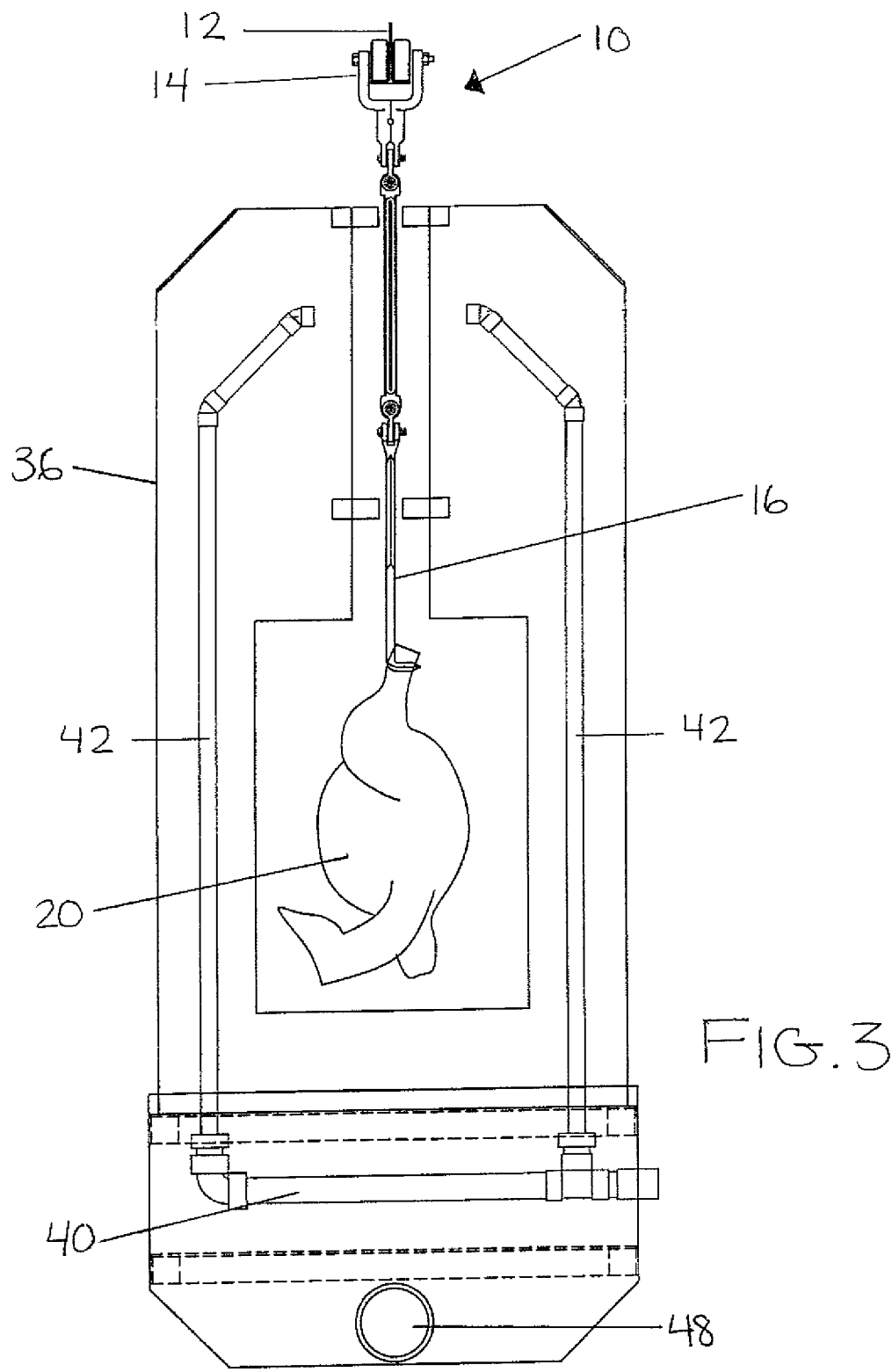
FIG. 3 is a partial cross-sectional end elevational view of the carcass cleaning apparatus of FIG. 2, taken through any of the three zones shown in FIG. 2.

Referring now to FIGS. 1 to 3, there is illustrated a cleaning apparatus generally designated by reference number 30. The cleaning apparatus 30 can define a station incorporated into an automated food processing system. The cleaning apparatus 30 can be installed on an existing or new automated processing line, or in other embodiments, need not necessarily be used in conjunction with an automated processing line. For exemplary purposes, the cleaning apparatus and process will now be described as it relates to processing eviscerated poultry (e.g., chickens, ducks, geese, turkeys, and the like). However, it is noted that the apparatus and process can also be employed as a station for automated processing of such food in other stages of a food processing system (e.g., prior to evisceration), and for other animal carcasses, fish, and other foods, such as vegetables and fruit, as would be apparent to those skilled in the art in view of this disclosure. In any case, the cleaning apparatus 30 can be used for treating various types of food with an anti-microbial agent to remove pathogens and/or retard spoilage caused by microbes.

As illustrated in FIGS. 1 and 2, the cleaning apparatus 30 can include a housing 36 having an entrance 32 and an exit 34 that allows eviscerated poultry carcasses 20 to enter and exit the housing 36 by means of a conveyor 10 (see FIG. 2). Also with reference to FIG. 2, water curtains 60 adjacent the housing entrance 32 and/or exit 34 can be used in order to help contain cleaning substances and byproducts of the cleaning process within the housing 36. The housing structure 36 can be fabricated from a corrosion resistant material or a combination of such materials, such as stainless steel, or USDA approved thermoplastics. It is not necessary that the invention be constrained to a design having only one such housing structure 36 along a processing system, as shown in the illustrated embodiment. Other possible configurations will be explained in the description that follows.

The conveyor 10 (if used) can comprise a track 12 that extends along each station of the processing system. The track 12 can be located anywhere with respect to the housing 36 facilitating the movement of carcasses through the housing 36, such as at an overhead location, a side location, or a floor location. With reference to FIG. 2, each poultry carcass 20 can be hung from a yoke 16 secured to a track follower 14 that can be moved along the track 12 of the automated processing system. The poultry carcasses 20 can be hung so that the vent 18 of each carcass 20 is oriented upward to permit spraying of a cleaning substance into the cavities as well as onto the exterior surfaces of the carcass 20 during cleaning operations.

Many cleaning substances in various forms (gas, liquid, powder) can be used in conjunction with the cleaning apparatus 30 without departing from the scope of the present invention. These substances can be detergents, disinfectants, brine solutions, anti-microbial agents, and any other sterilizing, sanitizing, or cleaning substances acceptable for use in cleaning food product. For example, appropriate anti-microbial agents include phosphates, sodium chlorite, hydrogen peroxide, ozone, periacetic acid, hypochlorous acid, citric acid, lactic acid, sodium hypochlorite, ozonated water, combinations of substances comprising at least one of the foregoing antimicrobials, and the like. For the purposes of this description however, chlorine dioxide gas in solution is used.

In some embodiments, a mixing chamber 94 is used to prepare cleaning fluid for use in the cleaning apparatus 30. Operation of the mixing chamber 94 can be an integral part of an automated processing system for control and operation of the cleaning apparatus and connected equipment supplying cleaning fluid thereto. In some embodiments, a batch tank (not shown) can be connected between the mixing chamber 94 and any or all of the supply pipes 40 in order to collect and store mixed cleaning fluid prior to use. Such collection and storage can take place following dilution of one or more concentrated cleaning substances in the mixing chamber 94. Sensors can be located in the batch tank or suitable conduit(s) connecting the batch tank to the mixing chamber in order to measure and/or monitor pH, concentration, temperature, flow, and volume, among other things. In this manner, any desired property or properties of the resulting solutions used in the cleaning apparatus 30 can be controlled to ensure they meet regulatory standards. In other embodiments, the mixing chamber 94 can be connected directly to one or more of the supply pipes 40 of the cleaning system.

Figure 7:
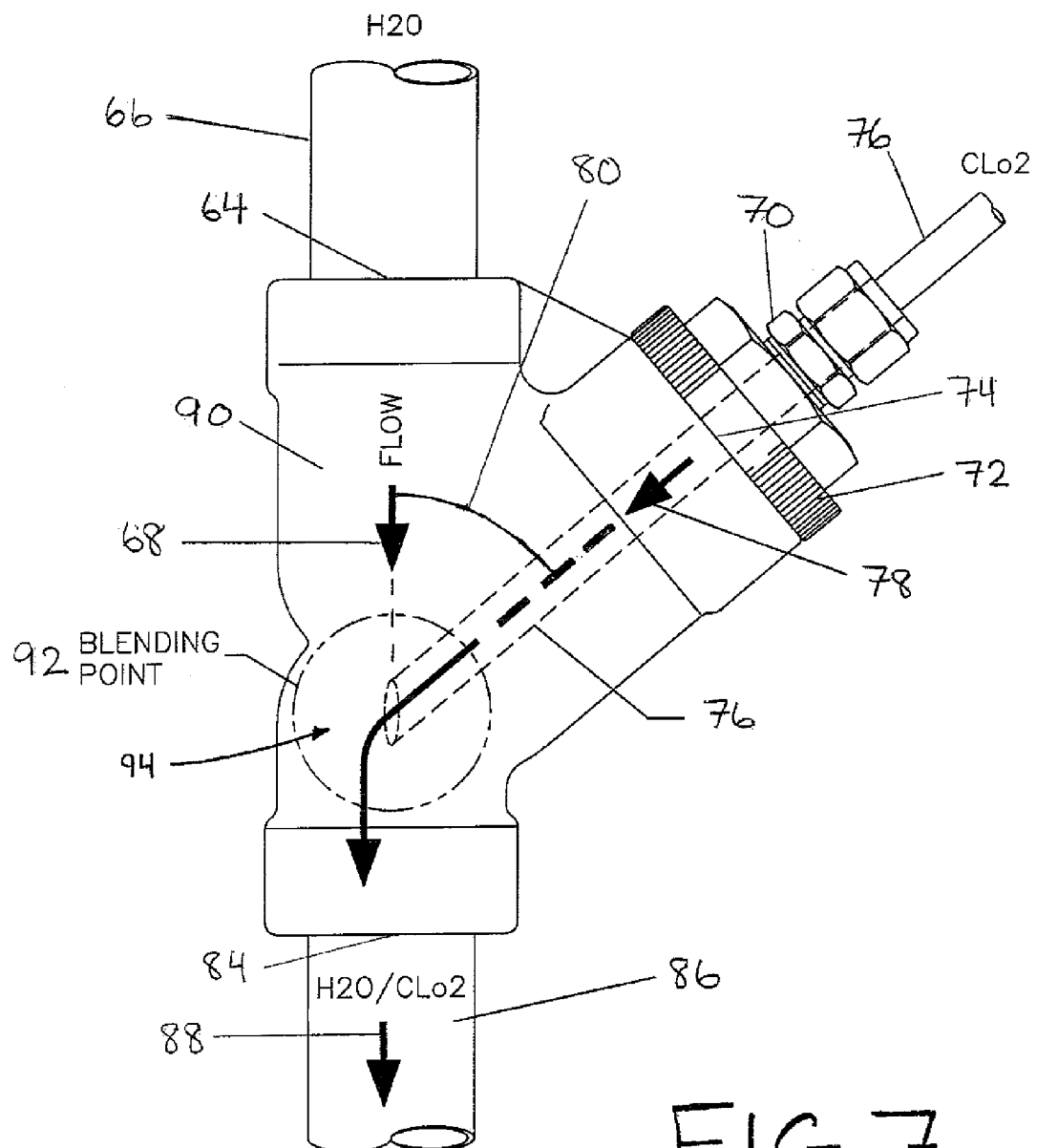
FIG. 7 is a perspective view of a mixing chamber fitting according to an embodiment of the present invention.

An example of a mixing chamber 94 is shown in FIG. 7, which illustrates a device that can be used to mix concentrated cleaning fluid with diluent (e.g., water, in some embodiments) for later delivery to the cleaning apparatus 30. As shown in FIG. 7, the mixing chamber can be defined in a "Y"-shaped fitting 90 having a first inlet 64, a second inlet 74, and an outlet 84. The second inlet 74 of the "Y"-shaped fitting 90 can be positioned at an angle 80 with respect to the first inlet 64. In some embodiments, more than two inlets and/or more than one outlet can be provided for the mixing chamber 94, such as to introduce concentrated cleaning fluid into the fitting through more than one inlet and/or to introduce diluent into the fitting 90 through more than one inlet. These alternative fittings can be particularly useful in applications where more than one type of diluent and/or more than one type of concentrated cleaning fluid is to be mixed. In some embodiments, sensors can be provided in either or both inlet 64, 74, and/or conduits 66, 76 to monitor properties of the component substances entering the mixing chamber 94.

Although the angle 80 illustrated in FIG. 7 is desirable in many applications, in other embodiments other acute angles between a vertical orientation of the fitting 90 and the second inlet 74 can be utilized. It should also be noted that the outlet 84 of the fitting 90 can be at any angle with respect to the inlets 64, 74, and can be in the same or a different plane from that formed by the angle between the inlets 64, 74.

FIG. 7 illustrates a first supply tube 66 and a second supply tube 76 that can be connected to the first inlet 64 and the second inlet 74 of the fitting 90, respectively. The first supply tube 66 and the second supply tube 76 provide conduits for a first element of the mixture (the general movement of which can be represented by arrow 68) and a second element of the mixture (the general movement of which can be represented by arrow 78) to the inlets 64, 74 of the mixing chamber 94. An outlet tube 86 can be connected to the outlet 84 of the mixing chamber to provide a conduit for the mixed fluid (the general movement of which can be represented by arrow 88) from the mixing chamber 94.

In other embodiments, the mixing chamber 94 can be defined in at least one fitting of another shape, a container, a combination of fittings and/or containers, and the like. However, an acute angle between one of the inlets 74 and another vertically-oriented or substantially vertically oriented inlet 64 can produce good performance results in many applications. Alternatively, an acute angle formed between each of the inlets 64, 74 and a substantially horizontal orientation can also produce good performance results. The inlets 64, 74 can both define a "Y"-shaped fitting 90 in these manners, and can be used to introduce one element into the flow of another for mixing purposes. As noted above, in other embodiments, the fitting 90 can be adapted to introduce more than one other element into another, such as through the use of three or more inlets (which can permit simultaneous introduction of such elements, in some embodiments). Alternatively, such mixing can be accomplished by introducing different elements into the mixing chamber 94 through the same inlet 64, 74 in consecutive steps. In addition, the fitting 90 can be provided with any number of mechanical implements (not shown) to assist in the mixing process. The mechanical implements can be actively powered or can make use of the power generated by the flowing fluid(s).

In some embodiments, the "Y"-shaped fitting 90 can be adapted from a "Y" strainer, in which case the strainer can be removed or modified to make room for the second supply tube 76 (if necessary). Also if necessary, the second supply tube 76 can be connected to the second inlet 74 of the "Y"-shaped fitting 90 with a cap 72 having a tapped hole or modified to have a tapped hole for accommodating the supply tube 76. In some embodiments, one or more connectors 70 can be used to form a sealed connection between the second supply tube 76 and the cap 72 and/or the second inlet 74. Such connectors include, without limitation, any type of compression fittings, threaded fittings, and the like. Such connection types can be provided at any of the inlets or outlets of the "Y"-shaped fitting 90. The connectors, tubing, and mixing chamber can be made of Polyflo or other materials suitable for the types of fluid being supplied through the "Y"-shaped fitting 90, including many types of metal, alloys, composites, plastics, and combinations of these, among others. Additionally, any of these materials can be treated with a coating to prevent corrosion. Both direct and indirect connections between the tubes and the inlets/outlets can be made by welding, soldering, threaded connections, adhesive, or by other means known to those of skill in the art.

The shape and orientation of the mixing chamber 94, the inlets 64, 74, and the outlets 84 can be designed to facilitate the mixing process. In the embodiment of FIG. 7, the mixing chamber 94 can be oriented such that the flow 68 of the first element is in a substantially downward direction. For the purposes of this description, the arrow 68 represents the flow of diluent (e.g., water, in the illustrated embodiment). The second element of the mixture can flow in a partially downward direction due to the angle 80. For the purposes of this description, arrow 78 represents the flow of the concentrated cleaning chemical (e.g., chlorine dioxide, in the illustrated embodiment). In some embodiments, the second supply tube 76 can extend beyond the second inlet 74 into the flow path 68 of the first element (water, in this case), creating a blending zone 92 where the flows 68, 78 meet. One or more metering valves (not shown) can be located at or upstream of at least one inlet or supply tube of the "Y"-shaped fitting 90 to measure, monitor, and/or control the flow of any or all of the elements. Similarly, flow meters and/or other sensors can be located at or downstream of the outlet 84 or outlet tube 86 to measure, monitor, and/or control the flow 88 of the mixed solution from the mixing chamber 94. Providing the second flow path 78 at an acute angle 80 to the first flow path 68 can minimize back pressure on the supply tube 76, which can help ensure sufficient blending of the elements.

It should be noted that in other embodiments of the present invention, the supply of diluent and the supply of concentrate to the mixing chamber 94 in the illustrated embodiment can be reversed while still performing the desired mixing function. In such cases, the supply tube 76 can be provided in the first inlet 64 and/or the supply tube 66 can be provided in the second inlet 74. Also, in other embodiments, the diluent and concentrate can both be supplied to the mixing chamber via respective supply tubes 76 (or 66).

In some embodiments, the cleaning apparatus 30 has one or more zones 22, 24, 26 in which carcasses 20 are exposed to one or more types of cleaning substances. The zones 22, 24, 26 can be completely or partially open to one another within the housing 36. For example, the cleaning apparatus illustrated in FIG. 2 has two dividing walls 33 partially separating zone one 22 from zone two 24, and zone two 24 from zone three 26. These dividing walls 33 can separate the zones 22, 24, 26 from each other to any degree, and in some embodiments (see FIG. 5) do so substantially completely with the exception of openings sufficiently large to permit the passage of carcasses 20 between the zones 22, 24, 26.

The cleaning substances can extend through any number of different supply pipes 40 to the cleaning apparatus, such as one or more supply pipes per zone 22, 24, 26, one or more supply pipes common to two or more zones, and the like. In the illustrated embodiment of FIG. 2, for example, each zone 22, 24, 26 has a dedicated supply pipe 40 supplying cleaning fluid to the respective zone. The supply pipe(s) 40 can extend from a mixing apparatus (e.g., mixing chamber, vessel, conduit, and the like, not shown) in which the cleaning fluid is prepared and/or stored. With reference to FIG. 3, in some embodiments, the supply pipes 40 for one or more zones 22, 24, 26 are connected to and supply cleaning fluid to at least one header pipe 42 in each zone 22, 24, 26. The header pipes 42 provide conduits for cleaning fluid between the supply pipe 40 and at least one outlet. In some embodiments, the outlet can be a nozzle of a desired type (e.g., first type of spray nozzle 44 or a second type of nozzle 46). The header pipe 42 can have multiple branches (not shown) oriented in any direction within the housing 36. Additionally, each of the nozzles 44, 46 connected to the header pipe 42 can be oriented in any direction within the housing. In some embodiments, the spray nozzle 44 dispenses a relatively low volume of cleaning substance, and can do so at a relatively high pressure. In some embodiments, flat jet spray nozzles are used for spray nozzle 44. Also in some embodiments, the second type of nozzle 46 dispenses a relatively high volume of the cleaning substance, and can do so at a relatively low pressure. This second type of nozzle can comprise a variety of nozzles, such as a flood nozzle, a full cone nozzle, and the like.

The apparatus 30 can incorporate valves 52 (see FIGS. 4-6) and/or pumps (not shown) to control the flow rate of the cleaning substance dispensed from each nozzle 44, 46. Some embodiments can also include sensors 56 that can be coupled to or incorporated integrally within the pipes 40, 42, valves 52, tanks (not shown), and/or nozzles 44, 46, or positioned in any suitable manner within (each zone 22, 24, 26) or outside of the housing 36 for process control and/or safety purposes. These sensors 56 can be used to monitor one or more properties of the cleaning substance supplied within the apparatus 30, such as the pH level of a cleaning fluid, the concentration of cleaning agent in the cleaning fluid, and the like. These sensors 56 can be connected to processing equipment (not shown) in any desired manner for sensing and controlling such properties of the cleaning substance supplied within the apparatus 30, such as for sensing and controlling the chemical concentration or acidity level (dosing) in any zone in the apparatus 30, or the rate of delivery of the cleaning substance in each zone 22, 24, 26. In this regard, feedback loops can enable constant or periodic adjustment of such properties based upon signals received from the sensors. In some embodiments, data from the sensors is collected, processed, displayed, and recorded in a central location, such as a control panel viewable by a user. The control panel can provide for manual or automatic adjustment of dosing equipment as well as integrated ventilation, drainage, and safety/alarm systems. Some examples of possible properties that the sensors 56 can monitor include: pressure, chemical concentration, temperature, pH, humidity, liquid level, and flow rate, among others. Any type and number of sensors can be used for detecting one or more properties of the cleaning substance supplied within the apparatus 30, the effluent drained from the apparatus 30, or the air quality surrounding the apparatus 30.

In some embodiments, different types of sensors can be utilized for different zones 22, 24, 26 of the apparatus 30, depending upon various factors in each zone (e.g., in light of the environmental conditions to which the sensors will be exposed in a given zone, the need to monitor one or more chemical properties with more precision in a given zone, and the like).

For example, in some embodiments, zones 1 and 3 can be provided with amperometric sensors such as those from Walchem Inc. in order to measure and/or monitor the concentration of chlorine dioxide in these zones, and in some embodiments for recording this concentration over a period of time. As another example, zone 2 can be provided with one or more on-line spectrophotometric probes such as those from Optek Inc. in order to measure and/or monitor the relatively high level of chlorine dioxide in zone 2. Such sensors can also be provided as part of a control feedback loop to regulate the concentration of the cleaning fluid (e.g. by controlling the flow of elements into the mixing chamber 94). Also, any of the zones 22, 24, 26 can be provided with pH sensors for monitoring and/or controlling the pH of the fluid in such zones. For example, in the illustrated embodiment, zones 2 and 3 are provided with pH sensors in order to measure and/or monitor the acidity of the cleaning fluid in these zones. These sensors can also be provided as part of a feedback loop in order to control the acidity of the cleaning fluid in any of the zones 22, 24, 26. For example, an acid pump can be tied to the flow meter, such that additional acid can be fed to the zone 2 antimicrobial solution as determined by the pH probe or the flow meter that is measuring the dilution water volume delivery rate.

One or more flow sensors can also be used in any of the zones 22, 24, 26 to monitor and possibly record the flow rate of chemical solution in such zones 22, 24, 26. For example, Burkert paddle wheel flow sensors can be provided in any or all of the first, second, and third zones 22, 24, 26 of the illustrated embodiment for such purposes, and can provide a control feedback loop to regulate the flow rate of the cleaning solution in these zones 22, 24, 26 or to perform other functions (e.g., pH control of one or more zones 22, 24, 26 such as to zone 3 in some embodiments, flow rate history recording in any of the zones 22, 24, 26, and the like).

Other types of sensors in other zones and combinations of zones are possible, and fall within the spirit and scope of the present invention.

Additionally, electrochemical or other types of air monitors (not shown) can be included in the system. For example, an air monitor can be located near the mixing chamber and batch tank (which can be located in a separate chemical room, in some embodiments), and another air monitor can be located on the processing floor near the operators, inspectors, and spray cabinet. Alarms can be tied to these sensors to alert personnel and/or shut down the system if certain levels are exceeded. In some embodiments, the alarm can be a flashing light, a siren, or an automatically generated email message regarding the specifics of the situation, among others. In an embodiment using acidified $ClO_2$ as the cleaning substance, electrochemical $ClO_2$ gas detectors (such as those manufactured by Industrial Scientific Corp. with a minimum detection limit of 0.01 ppm) can be placed within a reasonable distance (e.g., approximately 5 feet) of the apparatus to ensure operator safety and to add redundancy to other sensors within the system.

With reference now to FIGS. 2-6 of the illustrated embodiment, the floor of the housing 36 can have at least one drainage section 50, and can connect to one or more drain pipes 48 removing the cleaning substance(s) from the housing 36. In the illustrated embodiment of FIG. 2, the cleaning substance collected in each of three drainage sections 50 is comingled in a common drain pipe 48 and passed to a recovery or disposal tank (not shown). In other embodiments, drainage sections 50 can also have dedicated drain pipes 48 that pass their contents separately to recovery or disposal tanks. The cleaning fluids passing through the drain pipe(s) 48 can be recovered and recycled in some embodiments, such as by recycling cleaning fluid in the illustrated embodiment of FIG. 2 into the chlorine dioxide supplied to the apparatus 30. In other embodiments, the cleaning fluids exiting through the drain pipe(s) 48 are not recycled to the apparatus 30.

In some embodiments, the apparatus 30 can use exhaust vents 54 to evacuate airborne toxins and/or other chemicals from the housing 36 (e.g. gas that comes out of solution, powder, vapors, etc.). As described above, some embodiments can also include a monitoring system with sensors 56 that can be mounted inside and/or outside the housing 36 for process control and/or safety purposes.

The function of the illustrated apparatus 30 is most easily described by distinguishing the steps of a cleaning process. In the illustrated embodiment of FIG. 2, each step takes place in a separate spatial zone 22, 23, 24 within the housing 36. In some embodiments, one or more of these spatial zones can be combined.

Figure 4:
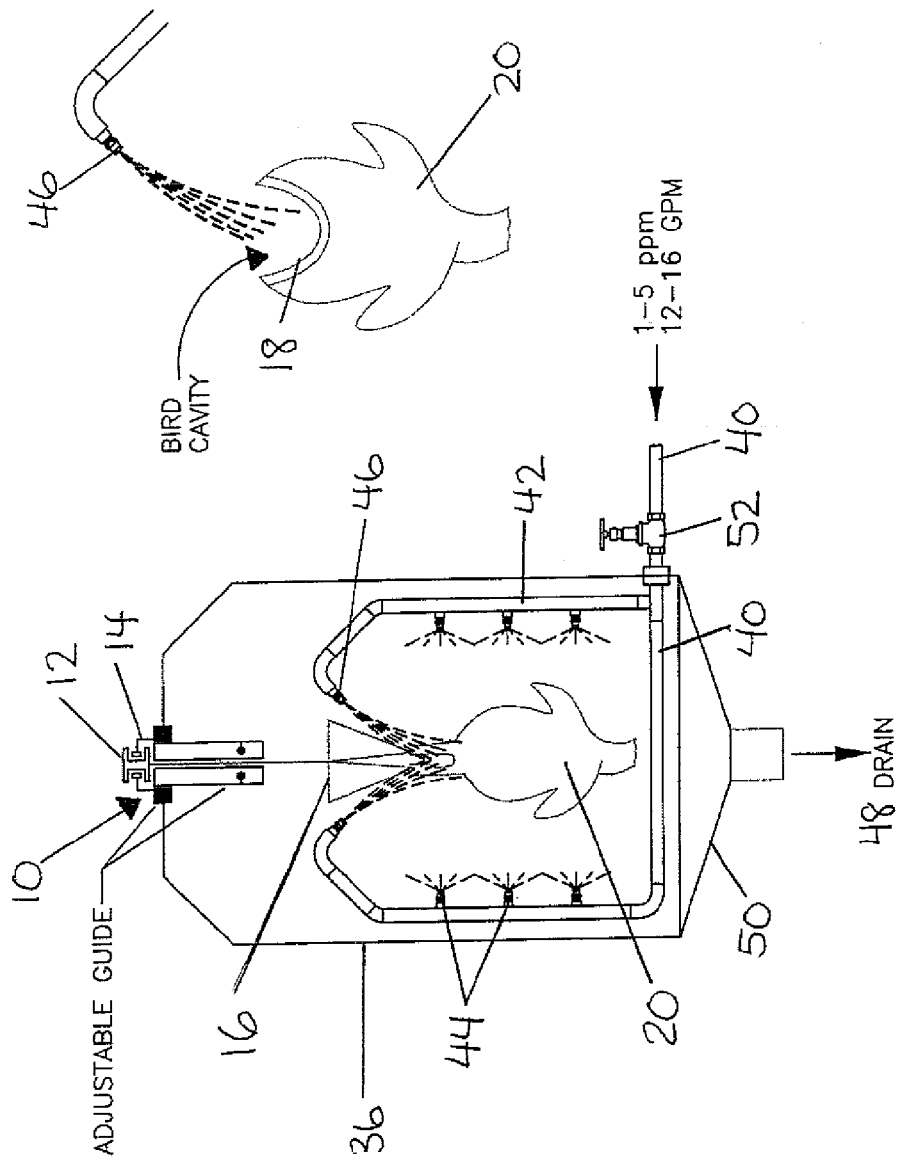
FIG. 4 is a cross-sectional end elevational view of the carcass cleaning apparatus of FIG. 2, taken through the first zone shown in FIG. 2.

As shown in FIG. 1, the first zone 22 is located within the housing 36 closest to the entrance 32. In the first zone 22, a pre-rinse can be used to remove gross soils (primarily fecal contamination) from eviscerated poultry carcasses 20 in some applications. Zone one 22 of the illustrated embodiment is shown in FIG. 4. In some embodiments, at least one set of two header pipes 42 can extend upward adjacent side walls of the housing 36. Any number of spray nozzles 44 can extend from each of the header pipes 42. Each spray nozzle 44 can be directed to dispense the cleaning substance toward the carcasses 20 on the conveyor 10. The spray nozzles can be positioned and directed to drench spray the carcasses (i.e., contact all external surfaces with the solution being sprayed). The ends of the header pipes 42 can be shaped to extend toward the conveyor line and in a generally downward direction to direct the cleaning substance dispensed from nozzles 46 at the ends of the header pipes 42 toward the carcasses 20 on the conveyor 10. These nozzles 46 can be used to flood (i.e., fill or substantially fill) the interior cavities of the carcasses 20 with the cleaning substance. In some embodiments, the pre-rinse provided by zone one 22, provides category 1 (hedonic scale) carcasses, such that there is no visible contamination of the carcass.

In some embodiments, a chlorine dioxide solution at a concentration of no less than about 0.1 ppm is dispensed from nozzles 44, 46 in zone one 22. Alternatively, a chlorine dioxide solution at a concentration of no less than about 1.0 ppm dispensed from nozzles 44, 46 in zone one 22 can be used to provide desired results. Also, in some embodiments, a chlorine dioxide solution at a concentration of no greater than about 5.0 ppm is dispensed from nozzles 44, 46 in zone one 22. Alternatively, a chlorine dioxide solution at a concentration of no greater than about 3.0 ppm dispensed from nozzles 44, 46 in zone one 22 can be used to provide desired results. The acidity level of the chlorine dioxide solution dispensed in this section (zone one 22) is not adjusted in the illustrated embodiment of FIGS. 2-6, but can be in other embodiments.

In some embodiments, the above-described chlorine dioxide solution is dispensed from the collective nozzles 44, 46 in zone one 22 at a flow rate of no less than about 2 gpm. Alternatively, this chlorine dioxide solution can be dispensed from the collective nozzles 44, 46 in zone one 22 at a flow rate of no less than about 12 gpm. In other embodiments, the above-described chlorine dioxide solution is dispensed from the collective nozzles 44, 46 in zone one 22 at a flow rate of no greater than about 10 gpm. In still other embodiments, the above-described chlorine dioxide solution is dispensed from the collective nozzles 44, 46 in zone one 22 at a flow rate of no greater than about 20 gpm. Alternatively, this chlorine dioxide solution can be dispensed from the collective nozzles 44, 46 in zone one 22 at a flow rate of no greater than about 16 gpm.

Figure 5:
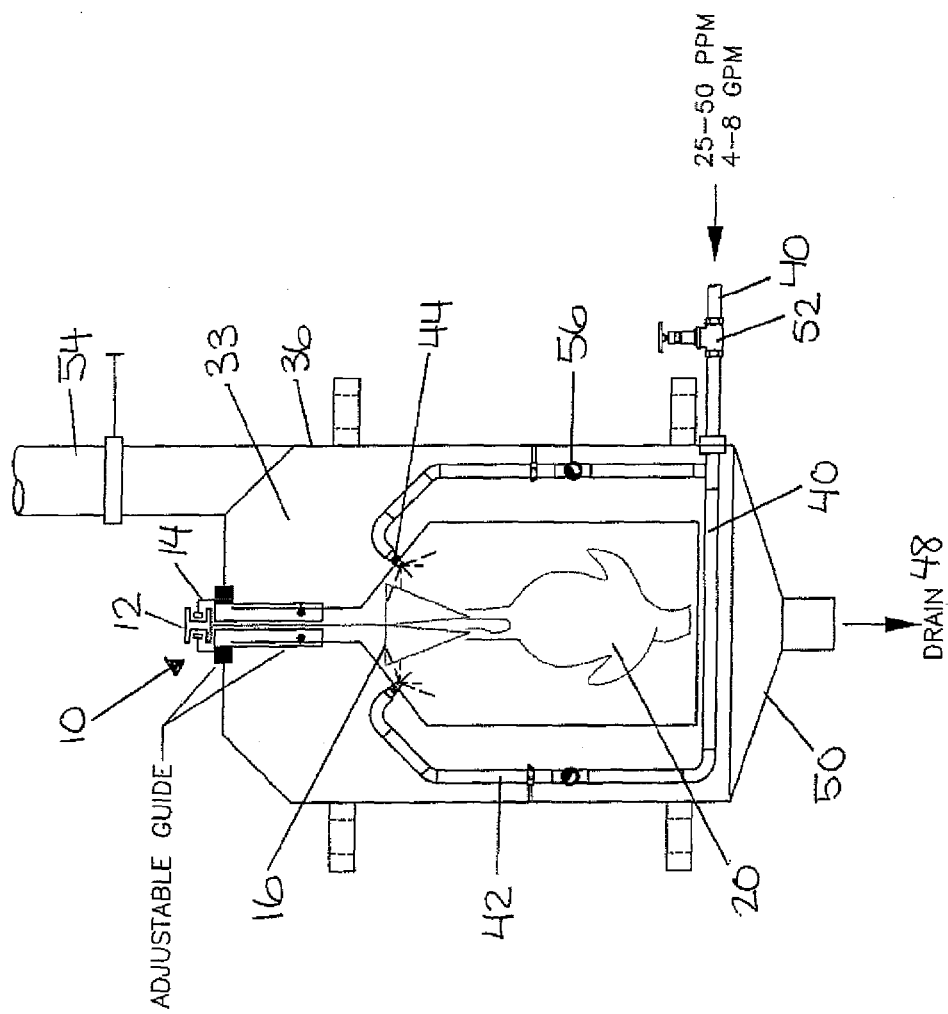
FIG. 5 is a cross-sectional end elevational view of the carcass cleaning apparatus of FIG. 2, taken through the second zone shown in FIG. 2.

In the illustrated embodiment of FIGS. 2-6, the second zone 24 of the apparatus 30 is located within the housing 36 downstream of the conveyor 10 from the first zone 22. In the second zone 24, efficacious quantities of the cleaning substance (at a generally higher chemical concentration than zones one and three 22, 26, and possibly at a generally lower flow rate than zone one 22) can be applied in order to significantly reduce the pathogen levels on the inner and outer surfaces of the poultry carcasses 20. Zone two 24 of the illustrated embodiment of FIGS. 2-6 is shown in FIG. 5. In some embodiments, at least one set of two header pipes 42 can extend upward adjacent side walls of the housing 36. Any number of spray nozzles 44 can be connected to the header pipes 42 and can be directed to dispense the cleaning substance toward the carcasses 20 on the conveyor 10. In the illustrated embodiment of FIGS. 2-6, the ends of the header pipes 42 are shaped to extend toward the conveyor line and in a generally downward direction to direct the cleaning substance dispensed from spray nozzles 44 at the ends of the header pipes 42 toward the carcasses 20 on the conveyor 10. In some embodiments, nozzles are positioned and directed to contact all internal and external surfaces of the carcass (or other item), by film spraying.

In some embodiments, a chlorine dioxide solution at a concentration of no less than about 10 ppm is dispensed from the spray nozzles 44 in zone two 24. Alternatively, a chlorine dioxide solution at a concentration of no less than about 25 ppm dispensed from the spray nozzles 44 in zone two 24 can provide desired results. Also, in some embodiments, a chlorine dioxide solution at a concentration of no greater than about 100 ppm is dispensed from the spray nozzles 44 in zone two 24. Alternatively, a chlorine dioxide solution at a concentration of no greater than about 50 ppm is dispensed from the spray nozzles 44 in zone two 24. The acidity level of the chlorine dioxide solution can be adjusted to a pH of 2-4 in some embodiments, and can be adjusted to other levels in other embodiments, as desired. In one particular embodiment, an acidified chlorine dioxide solution, such as described in co-pending PCT Patent Application No. PCT/US2007/085211, is used in zone two 24. The entire contents of co-pending PCT Patent Application No. PCT/US2007/085211 is hereby incorporated by reference.

In some embodiments, the above-described chlorine dioxide solution is dispensed from the collective spray nozzles 44 in zone two 24 at a flow rate of no less than about 1 gpm. Alternatively, this chlorine dioxide solution can be dispensed from the collective spray nozzles 44 in zone two 24 at a flow rate of no less than about 4 gpm. In some embodiments, the above-described chlorine dioxide solution is dispensed from the collective spray nozzles 44 in zone two 24 at a flow rate of no greater than about 10 gpm. Alternatively, this chlorine dioxide solution can be dispensed from the collective spray nozzles 44 in zone two 24 at a flow rate of no greater than about 8 gpm.

Figure 6:
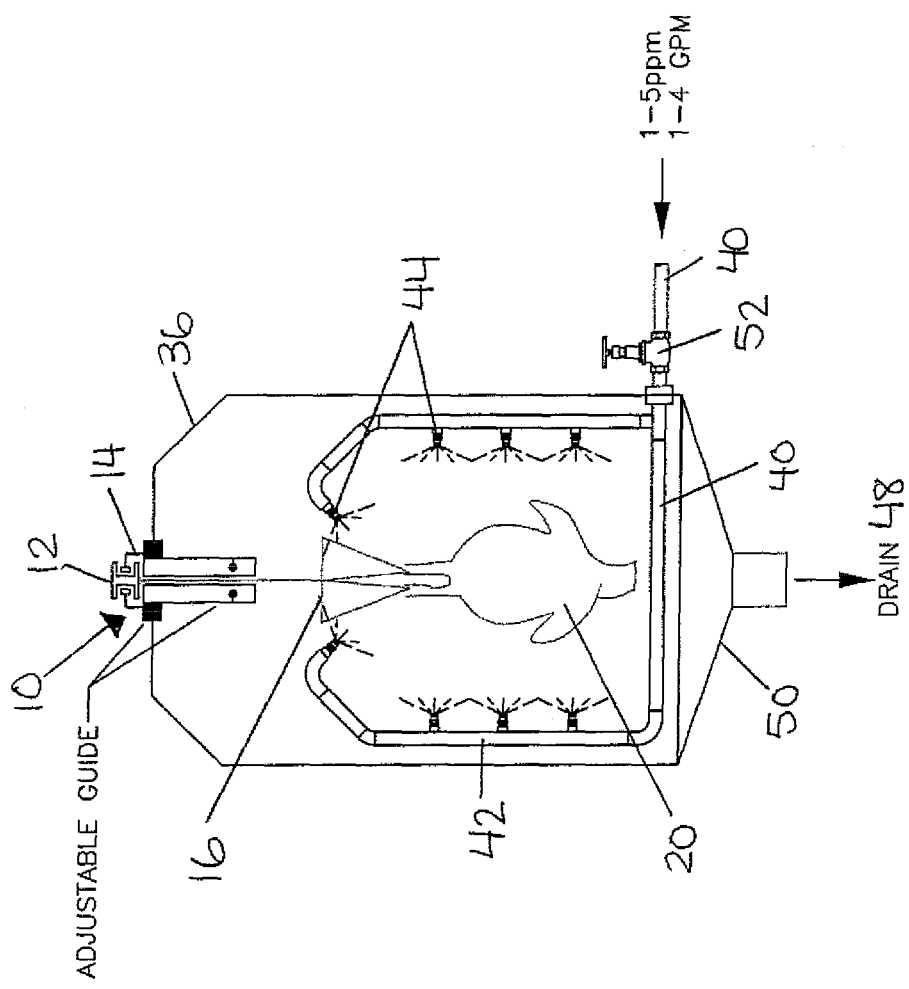
FIG. 6 is a cross-sectional end elevational view of the carcass cleaning apparatus of FIG. 2, taken through the third zone shown in FIG. 2.

As shown in FIG. 2, a third zone 26 is located within the housing 36 downstream of the conveyor 10 from the first and second zones 22, 24. In the third zone 26, a post-rinse can be used to remove excess amounts of the cleaning agent from the poultry carcasses 20. This post-rinse can be provided by supplying a cleaning substance having a lower concentration of cleaning agent than provided in zone two 24. In some embodiments, this lower concentration flow can be used to lower the concentration of cleaning agent on the carcasses 20 in zone three 26 to a level meeting national or local health and/or safety regulations prior to exit of the carcasses 20 from the housing 36. For example, in some embodiments, the concentration of residual chlorine dioxide on the carcasses 20 can be reduced to no greater than 3 ppm upon exiting zone three 26. By utilizing such a cleaning agent flow in zone three 26, a higher and more effective cleaning fluid flow in zone two 24 can be used while still quickly bringing the food product within health and/or safety regulations upon completion of the cleaning process. Zone three 26 of the illustrated embodiment is shown in FIG. 6. In some embodiments, at least one set of two header pipes 42 can extend upward adjacent the side walls of the housing 36. Any number of spray nozzles 44 can extend from each of the header pipes 42. Each spray nozzle 44 can be directed to dispense the cleaning substance toward carcasses 20 on the conveyor 10. In the illustrated embodiment of FIGS. 2-6, the ends of the header pipes 42 are shaped to extend toward the conveyor line and in a generally downward direction to direct the cleaning substance dispensed from spray nozzles 44 at the ends of the header pipes 42 toward the carcasses 20 on the conveyor 10. The nozzles 44 in this zone 26 can be used to film spray the inside and outside of the carcasses 20.

In some embodiments, a chlorine dioxide solution at a concentration of greater than 0 ppm is dispensed from the spray nozzles 44 in zone three 26. Alternatively, a chlorine dioxide solution at a concentration of no less than about 1 ppm dispensed from the spray nozzles 44 in zone three 26 can be used to provide desired results. Also, in some embodiments, a chlorine dioxide solution at a concentration of no greater than about 5 ppm is dispensed from the spray nozzles 44 in zone three 26. Alternatively, a chlorine dioxide solution at a concentration of no greater than about 3 ppm dispensed from the spray nozzles 44 in zone three 26 can be used to provide desired results. The acidity level of the chlorine dioxide solution can be adjusted to a pH of 2-4 in some embodiments, and can be adjusted to other levels in other embodiments, as desired.

In some embodiments, the above-described chlorine dioxide solution is dispensed from the collective spray nozzles 44 in zone three 26 at a flow rate of no less than about 0.5 gpm. Alternatively, this chlorine dioxide solution can be dispensed from the collective spray nozzles 44 in zone three 26 at a flow rate of no less than about 1 gpm. In some embodiments, the above-described chlorine dioxide solution is dispensed from the collective spray nozzles 44 in zone three 26 at a flow rate of no greater than about 5 gpm. Alternatively, this chlorine dioxide solution can be dispensed from the collective spray nozzles 44 in zone three 26 at a flow rate of no greater than about 4 gpm.

As illustrated in FIG. 1, the housing 36 can also include an automated cleaning header 58 that provides at least one conduit for a cleaning substance to be dispensed within the housing 36 to clean the apparatus 30.

Although the various embodiments of the apparatus 30 described above have a single housing, it should be noted that separate housings 36 can exist along the processing line in which at least one step of the treatment process can be performed. Additionally, the invention can incorporate other treatment processes along with those disclosed herein, including the use of brushes or other cleaning devices that can mechanically assist in the cleaning process. Furthermore, although chlorine dioxide solution is the cleaning substance used in each step of the illustrated embodiments described above, in other embodiments, different substances can be used in one or more of the steps.

Other modifications, changes, and substitutions are intended in the foregoing description and in the accompanying drawings, and in some instances, some features of the invention will be employed without a corresponding use of other features. For example, in some embodiments, the pre-rinse step need not necessarily be used if there is a minimal amount of particulate matter on the food items being processed. Also, although entrance and/or exit water curtains 60 can be used, in other embodiments such water curtains 60 may not be necessary.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

The invention claimed is:

1. An apparatus for cleaning carcasses with a cleaning substance, the apparatus comprising:
a housing having an interior region and at least one opening for passage of carcasses into the interior region; and
at least one supply conduit for supplying a cleaning substance into the housing, the supply conduit coupled to at least one nozzle for dispensing the cleaning substance within the interior region;
at least one effluent conduit for conveying waste from the housing;
wherein the cleaning substance is dispensed from the at least one nozzle in sequential phases, including a first phase in which the cleaning substance comprises chlorine dioxide at a concentration of no less than about 0.1 ppm, a second phase in which the cleaning substance comprises chlorine dioxide at a concentration of no less than about 10 ppm, and a third phase in which the cleaning substance comprises chlorine dioxide at a concentration of no less than about 1 ppm.

2. The apparatus according to claim 1, wherein the cleaning substance in the first phase comprises chlorine dioxide at a concentration of no less than about 1.0 ppm.

3. The apparatus according to claim 2, wherein the cleaning substance in the first phase is delivered at a rate of no less than about 2.0 gpm.

4. The apparatus according to claim 2, wherein the cleaning substance in the first phase is delivered at a rate of no less than about 12.0 gpm.

5. The apparatus according to claim 2, wherein the cleaning substance in the second phase comprises chlorine dioxide at a concentration of no less than about 10.0 ppm.

6. The apparatus according to claim 2, wherein the cleaning substance in the second phase comprises chlorine dioxide at a concentration of no less than about 25.0 ppm.

7. The apparatus according to claim 1, wherein the cleaning substance in the first phase comprises chlorine dioxide at a concentration of no greater than about 5.0 ppm.

8. The apparatus according to claim 1, wherein the cleaning substance in the second phase comprises chlorine dioxide at a concentration of no less than about 10.0 ppm.

9. The apparatus according to claim 8, wherein the cleaning substance in the third phase comprises chlorine dioxide at a concentration of no less than about 1.0 ppm.

10. The apparatus according to claim 1, wherein the cleaning substance in the second phase comprises chlorine dioxide at a concentration of no less than about 25.0 ppm.

11. The apparatus according to claim 1, wherein the cleaning substance in the third phase comprises chlorine dioxide at a concentration of no less than about 1.0 ppm.

12. The apparatus according to claim 1, further comprising a sensor within the housing, wherein the sensor is adapted to measure at least one property of the environment within the interior region of the housing.

13. The apparatus according to claim 1, further comprising a sensor within the supply conduit, wherein the sensor is adapted to measure at least one property of the cleaning substance.

14. The apparatus according to claim 1, wherein the interior region is divided into three spatial zones corresponding to each of the three phases, wherein each phase is carried out within a respective spatial zone of the three spatial zones.

15. The apparatus according to claim 14, wherein the three spatial zones are at least partially defined by partitions within the housing.

16. The apparatus according to claim 14, wherein each of the spatial zones has a dedicated supply conduit for conveying the cleaning substance thereto.

17. The apparatus according to claim 1, further comprising a conveyor positioned to move carcasses into, out of, and within the interior region.

18. The apparatus according to claim 1, further comprising a control system adapted to initiate and control the first, second, and third phases.

19. The apparatus according to claim 18, wherein the control system comprises at least one sensor and at least one dosing device.

20. The apparatus according to claim 1, wherein the at least one supply conduit is coupled to the at least one nozzle via at least one header pipe.

21. The apparatus according to claim 1, further comprising at least one other nozzle configured to dispense the cleaning substance at a different flow rate than the at least one nozzle.

22. The apparatus according to claim 1, wherein the at least one nozzle is positioned to dispense the cleaning substance directly onto carcasses within the interior region.

23. The apparatus according to claim 1, further comprising a water curtain positioned to at least partially cover an opening of the at least one opening in the housing.

24. A method of cleaning a carcass with a cleaning substance, the method comprising:
spraying the carcass for a first period of time with a cleaning substance comprising chlorine dioxide at a concentration of no less than about 0.1 ppm;
spraying the carcass for a second period of time with a cleaning substance comprising chlorine dioxide at a concentration of no less than about 10 ppm and at a flow rate greater than that of the first period of time; and
spraying the carcass for a third period of time with a cleaning substance comprising chlorine dioxide at a concentration of no less than about 1 ppm and at a flow rate less than that of the first period of time.

25. The method according to claim 24, further comprising combining a diluent and concentrate to produce the cleaning substance.

26. The method according to claim 24, further comprising conveying the cleaning substance from a mixing device into an interior region of a cleaning cabinet by at least one supply conduit.

27. The method according to claim 26, further comprising monitoring at least one property of the interior region of the cleaning cabinet.

28. The method according to claim 24, and further comprising monitoring at least one property of the cleaning substance prior to being sprayed.

29. The method according to claim 24, further comprising moving the carcass to a different location between each of the spraying steps.

30. The method according to claim 24, wherein spraying the carcass for the first period of time comprises spraying the carcass with a cleaning substance comprising chlorine dioxide at a concentration of no less than about 1 ppm.

31. The method according to claim 24, wherein spraying the carcass for the second period of time comprises spraying the carcass with a cleaning substance comprising chlorine dioxide at a concentration of no less than about 10 ppm.

32. The method according to claim 24, wherein spraying the carcass for the third period of time comprises spraying the carcass with a cleaning substance comprising chlorine dioxide at a concentration of no less than about 1 ppm.

33. The method according to claim 24, wherein the cleaning substance is sprayed during the first period of time at a rate of no less than about 2 gpm.

34. The method according to claim 24, wherein the cleaning substance is sprayed during the first period of time at a rate of no less than about 12 gpm.

* * * * *

UNITED STATES PATENT AND TRADEMARK OFFICE
CERTIFICATE OF CORRECTION

| | | | |
|---|---|---|---|
| PATENT NO. | : | 8,684,799 B2 | Page 1 of 1 |
| APPLICATION NO. | : | 12/517345 | |
| DATED | : | April 1, 2014 | |
| INVENTOR(S) | : | Brink et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1287 days.

Signed and Sealed this

Twenty-ninth Day of September, 2015

Michelle K. Lee
*Director of the United States Patent and Trademark Office*